(12) United States Patent
Inaba et al.

(10) Patent No.: US 6,195,137 B1
(45) Date of Patent: *Feb. 27, 2001

(54) LIQUID CRYSTAL APPARATUS

(75) Inventors: Yutaka Inaba, Kawaguchi; Akira Tsuboyama, Atsugi; Shinichi Nakamura, Isehara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/556,658

(22) Filed: Nov. 3, 1995

(30) Foreign Application Priority Data

Nov. 16, 1994 (JP) ................................... 6-306926

(51) Int. Cl.$^7$ .................................................. G02F 1/141
(52) U.S. Cl. ............................ 349/37; 345/96; 345/97; 349/174
(58) Field of Search .............................. 349/37, 174, 42; 345/92, 97, 207

(56) References Cited

U.S. PATENT DOCUMENTS

| | | | |
|---|---|---|---|
| 4,712,877 | 12/1987 | Okada et al. | 350/350 S |
| 4,747,671 | 5/1988 | Takahashi et al. | 350/336 |
| 5,058,994 | * 10/1991 | Mihara | 345/97 |
| 5,107,353 | * 4/1992 | Okumura | 345/96 |
| 5,124,820 | 6/1992 | Tsuboyama et al. | 359/56 |
| 5,227,900 | 7/1993 | Inaba et al. | 359/56 |
| 5,233,447 | 8/1993 | Kuribayashi et al. | 359/56 |
| 5,353,137 | 10/1994 | Tsuboyama et al. | 359/56 |
| 5,459,481 | * 10/1995 | Tanaka et al. | 345/95 |
| 5,521,727 | * 5/1996 | Inaba et al. | 345/89 |
| 5,615,026 | * 3/1997 | Koden | 349/174 |
| 5,790,092 | * 8/1998 | Moriyama | 345/96 |
| 5,920,301 | * 7/1999 | Sakamoto et al. | 345/96 |

FOREIGN PATENT DOCUMENTS

| | | |
|---|---|---|
| 06020278 | 1/1994 | (JP) . |
| 06202078 | 7/1994 | (JP) . |

* cited by examiner

*Primary Examiner*—Kenneth Parker

(57) ABSTRACT

A liquid crystal apparatus is constituted from a liquid crystal device including a first substrate having thereon a plurality of scanning lines, a plurality of data lines intersecting the scanning lines, an active element disposed at each intersection of the scanning lines and data lines, a plurality of pixel electrodes each connected to the scanning line and the data line via the active element and defining a pixel, a second substrate having a counter electrode thereon, and a ferroelectric liquid crystal disposed between the first and second substrates and capable of assuming an anti-ferroelectric state under application of no voltage and a first ferroelectric state and a second ferroelectric state under application of voltages corresponding to polarities of the applied voltages. The liquid crystal device is driven by applying voltages to the pixels so that each pixel is supplied with a voltage having a polarity which is inverted for each prescribed period, and a pixel having the ferroelectric liquid crystal in the first ferroelectric state and a pixel having the ferroelectric liquid crystal in the second state are co-present in each prescribed period. As a result, a difference in display performance when viewed in a oblique direction is alleviated.

4 Claims, 10 Drawing Sheets

ODD-NUMBERED FRAME

EVEN-NUMBERED FRAME

FIG. 3A ODD-NUMBERED FRAME

FIG. 3B EVEN-NUMBERED FRAME

FIG. 9A  ODD-NUMBERED FRAME

FIG. 9B  EVEN-NUMBERED FRAME

FIG. 10A ODD-NUMBERED FRAME

FIG. 10B EVEN-NUMBERED FRAME

FIG. 11A ODD-NUMBERED FRAME

FIG. 11B EVEN-NUMBERED FRAME

FIG. 12A ODD-NUMBERED FRAME

FIG. 12B EVEN-NUMBERED FRAME

LIQUID CRYSTAL APPARATUS

FIELD OF THE INVENTION AND RELATED ART

The present invention relates to a liquid crystal apparatus for displaying various data by using a liquid crystal showing a ferroelectric state and an anti-ferroelectric state.

Hitherto, various liquid crystal apparatus for displaying various data by using a liquid crystal have been proposed, inclusive of one using a liquid crystal capable of assuming a ferroelectric state and an anti-ferroelectric state (hereinafter called a "ferroelectric liquid crystal") as disclosed in Japanese Laid-Open Patent Application (JP-A) 6-20278.

Figure 1A:
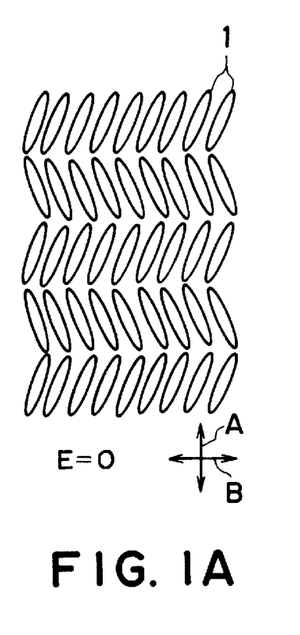
FIGS. 1A–1C illustrate three optical states of a ferroelectric liquid crystal used in the invention, including FIG. 1A showing an alignment of liquid crystal molecules in a dark state, FIG. 1B showing an alignment of liquid crystal molecules in a first bright state, and FIG. 1C showing an alignment of liquid crystal molecules in a second bright state.
Figure 1B:
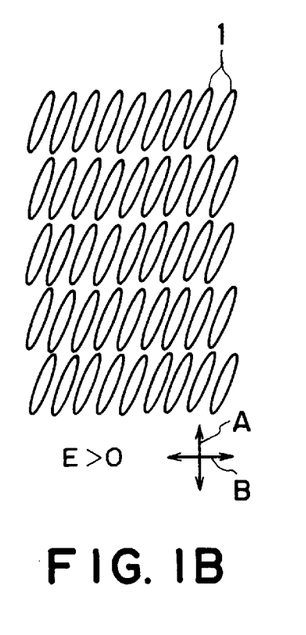
Figure 1C:
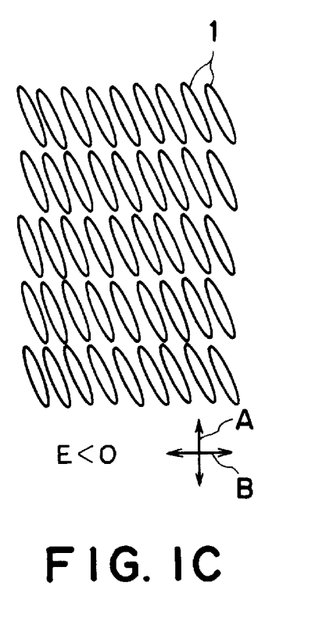

The ferroelectric liquid crystal is disposed in a non-helical state within a small gap between a pair of substrates and assumes a smectic layer structure as shown in FIG. 1A under no electric field (E=0) wherein liquid crystal molecules are tilted in directions which are opposite to each other and alternate layer by layer of smectic layers, thereby providing an average optical axis parallel to the smectic layer normal (in a direction of arrow A in FIG. 1A). If a liquid crystal device containing such a ferroelectric liquid crystal is sandwiched between a pair of polarizers arranged in cross nicols and having absorption axes A and B, respectively, the ferroelectric liquid crystal assumes a dark state (anti-ferroelectric state) under no electric field where the optical axis is parallel to the layer normal direction. If a voltage of positive polarity (E>0) is applied to the liquid crystal, a transition to a ferroelectric state is caused, wherein all the liquid crystal molecules 1 are tilted, e.g., rightwards as shown in FIG. 1B to provide a tilted optical axis in the direction of the tilted liquid crystal molecules. Accordingly, in the case where the polarizers are arranged in the above-described position the same as in FIG. 1A, the liquid crystal assumes a bright state (ferroelectric state) (hereinafter called a "first bright state" or a "first ferroelectric state"). Further, when the ferroelectric liquid is supplied with a voltage of negative polarity (E>0), all the liquid crystal molecules 1 are tilted, e.g., leftwards to provide a correspondingly tilted optical axis as shown in FIG. 1C. Accordingly, in the case of the same polarizer arrangement, the liquid crystal also assumes a bright state (hereinafter called a "second bright state" or a second "ferroelectric state").

The above-mentioned JP-A 6-202078 discloses a method of using the above-mentioned properties of a ferroelectric liquid crystal and displaying a bright state while inverting the applied voltage E for each of prescribed period (prescribed frame) (hereinafter, this method is called "polarity-inversion drive method"). The polarity-inversion drive method will now be described with reference to FIGS. 2 and 3.

Figure 2:
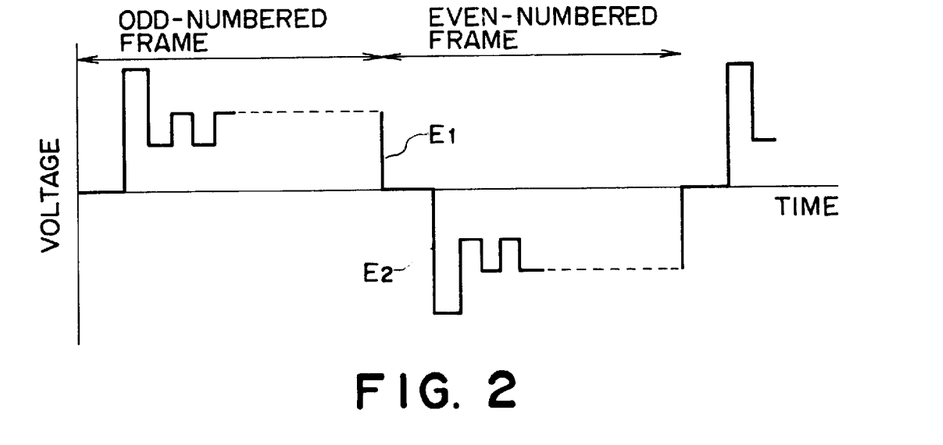
FIG. 2 is a diagram for illustrating a voltage waveform applied to a pixel displaying a bright state in the polarity-inversion drive method.
Figure 3A:
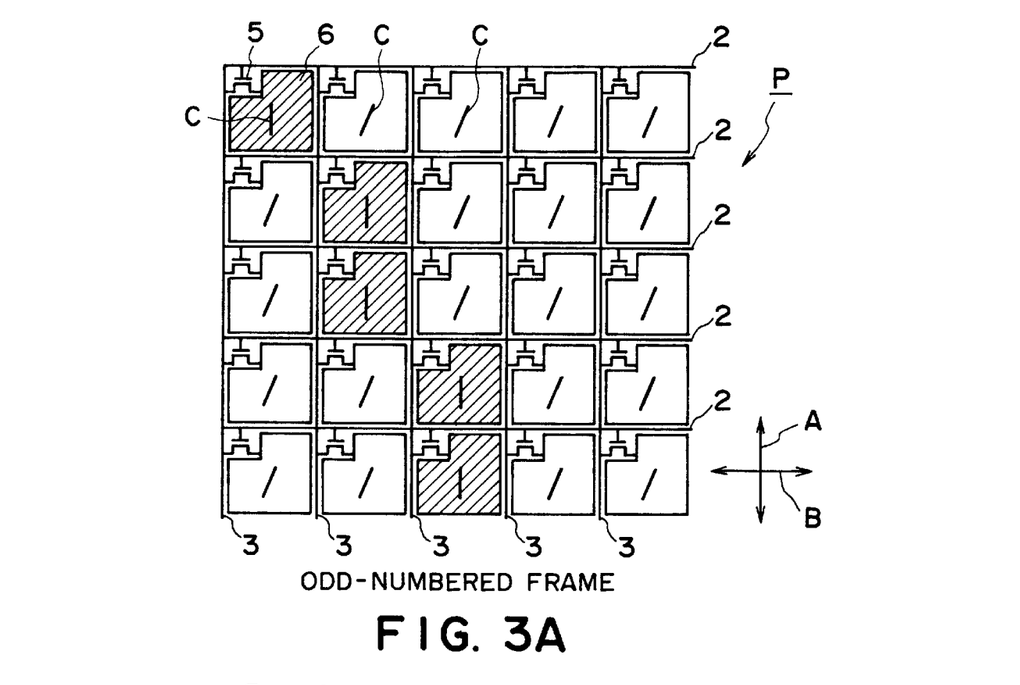
FIGS. 3A and 3B are illustrations of display states at respective pixels in a liquid crystal display device driven according to the polarity-inversion drive method, including FIG. 3A showing a display state in an odd-numbered frame and FIG. 3B showing a display state in an even-numbered frame.
Figure 3B:
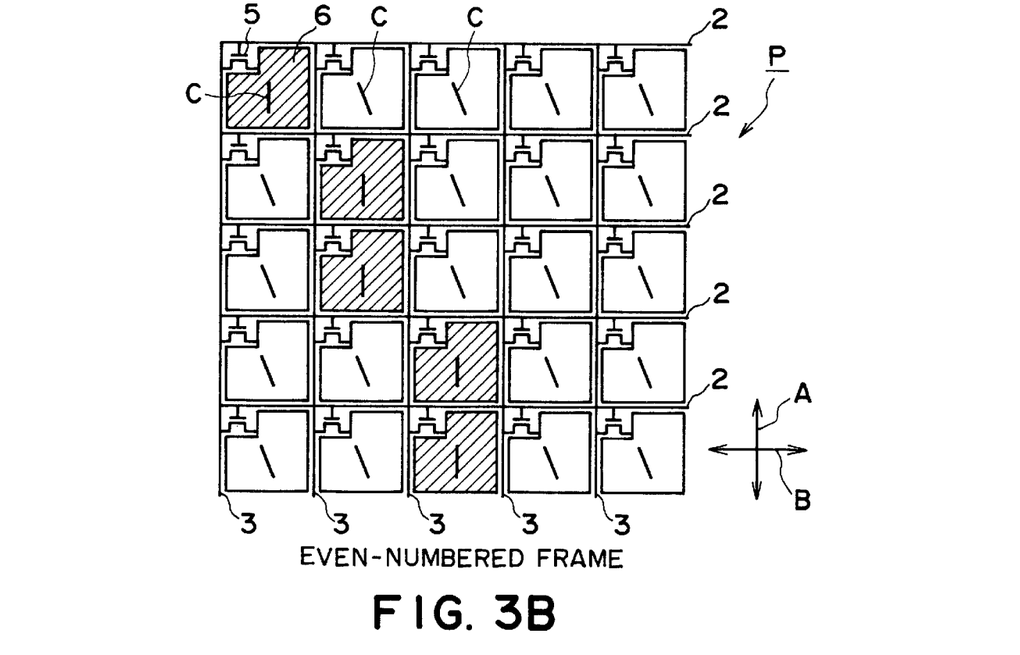

FIG. 2 shows a voltage waveform applied to a pixel displaying bright states. In the polarity-inversion drive method, such a pixel is, for example, supplied with a positive-polarity voltage E1 to form a first bright state in an odd-numbered frame and supplied with a negative-polarity voltage E2 to form a second bright state in an even-numbered frame, whereby the pixel is designed to continuously display bright states while inverting the applied voltage polarity for each frame.

FIGS. 3A and 3B are enlarged schematic views of respective pixels showing bright and dark states in a liquid crystal display device P using such a feroelectric liquid crystal, wherein pixels in a dark state are indicated with hatching and pixels in a bright state are indicated with no hatching. FIG. 3A shows a display state in an odd-numbered frame and FIG. 3B shows a display state in an even-numbered frame. Thus, the voltages E1 and E2 in FIG. 2 are applied to the non-hatched pixels. In the display state of an odd-numbered frame shown in FIG. 3A, the non-hatched pixels are supplied with a positive-polarity voltage E1 to provide a tilted liquid crystal optical axis as represented by a short line C. On the other hand, in the display state of an even-numbered frame shown in FIG. 3B, the non-hatched pixels are supplied with a negative-polarity voltage E2 to provide a reversely tilted liquid crystal optical axis as represented by a short line C. The hatched pixels are supplied with no voltage in any frame, so that the optical axes are directed vertically to provide a dark state. Incidentally, the liquid crystal display device P is provided with large numbers of scanning lines 2 and data lines 3 running vertically and laterally disposed on a glass substrate (not shown), and a field-effect transistor 5 is disposed at each intersection of the scanning lines 2 and the data lines 3. Each field-effect transistor 5 is connected to a pixel electrode 6 defining a pixel. (Details will be described later.) The arrows A and B in FIGS. 3A and 3B represent the absorption axes of the polarizers (not shown) arranged in cross nicols.

According to this method, the polarity of the voltage applied to pixels in a bright state is inverted for each frame as shown in FIG. 2, the voltage applied to the liquid crystal becomes averagely zero, thereby obviating the deterioration of the liquid crystal due to DC component.

Figure 4A:
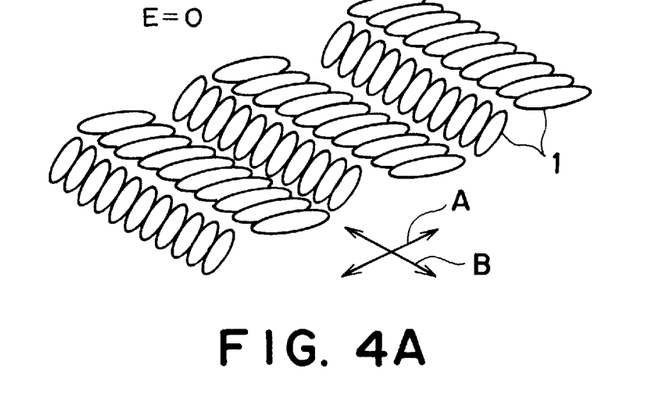
FIGS. 4A–4C are views in three optical states of a ferroelectric liquid crystal viewed in an oblique direction, including FIG. 4A showing an alignment of liquid crystal molecules in a dark state, FIG. 4B showing an alignment of liquid crystal molecules in a first bright state, and FIG. 4C showing an alignment of liquid crystal molecules in a second bright state.
Figure 4B:
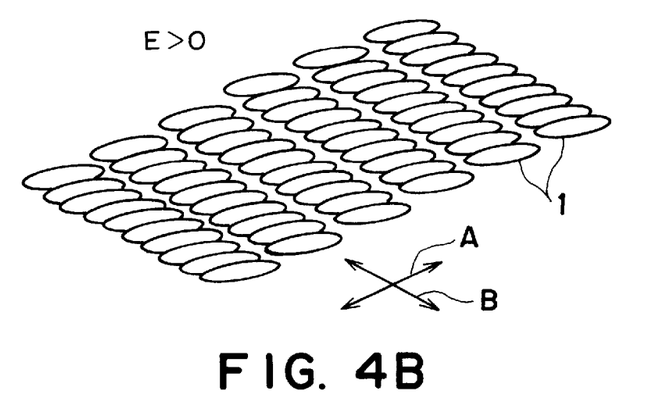
Figure 4C:
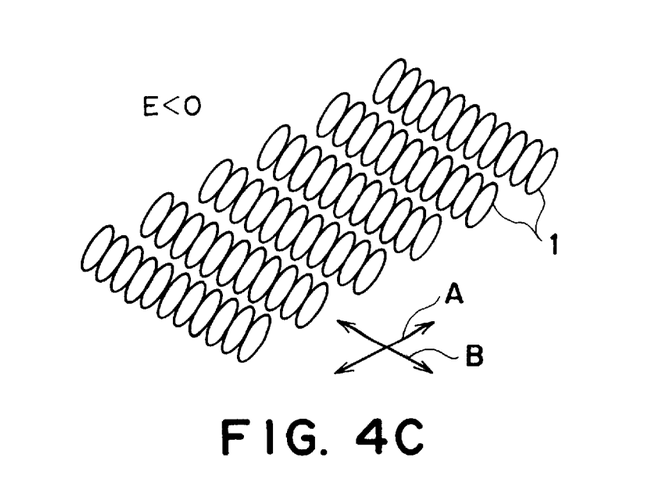

In the above-described manner, the ferroelectric liquid crystal assumes one dark state and two bright states depending on the electric field applied thereto. The alignments of liquid crystal molecules in the respective states may be as shown in FIGS. 4A–4C when viewed in an oblique direction. FIG. 4A shows an alignment of liquid crystal molecules 1 in the dark state, FIG. 4B shows an alignment of liquid crystal molecules 1 in the first bright state (under application of a positive-polarity voltage, E>0), and FIG. 4C shown an alignment state in the second bright state (under application of a negative-polarity voltage, E>0). Now, when viewed in an oblique direction, the orientations of liquid crystal molecules are different between the first and second bright states (FIGS. 4B and 4C), so that the refractive index anisotropy in the second bright state in remarkably smaller than that in the first bright state, thus resulting in ai difference in transmittance. Further, when the liquid crystal display device P is viewed in an oblique direction in this manner, the optical path length is increased, the retardation is deviated from an optimum value in the first bright state to provide a yellowish tint when compared with that in the second bright state.

Thus, in the polarity-inversion drive method wherein the above-mentioned first and second bright state are alternately switched from each other for each frame, the liquid crystal display device P, when viewed in an oblique direction, provides transmittances and hues which periodically changes, thus causing "flickering" and inferior display image quality.

The above-mentioned problem becomes further serious when the ferroelectric liquid crystal is subjected to an active matrix drive. More specifically, when an ordinary case of using a transistor as an active element, a transistor shows a difference in its performance depending on whether it is used to charge a pixel to a positive voltage or to a negative voltage. Accordingly, different magnitudes of voltage are applied to the ferroelectric liquid crystal in the two ferroelectric states of FIGS. 1B and 1C, so that different transmittances result not only when viewed in an oblique direction as described but also when viewed normally or from a frontal position. As is well known, such an asymmetrical performance of a transistor is attributable to a phenomenon that a gate pulse exerts an induction voltage to a pixel voltage via a floating capacitance between the gate and drain. The same asymmetrical performance is caused also in active-matrix drive of a TN (twisted nematic) liquid crystal. However, in the case of a TN liquid crystal, a dark state is formed by a voltage application, so that the flickering is relatively alleviated. On the other hand, in the case of a ferroelectric liquid crystal, the flickering is caused in the bright state and is therefore very noticeable.

SUMMARY OF THE INVENTION

Accordingly, an object of the present invention is to provide a liquid crystal apparatus using an ferroelectric liquid crystal capable of preventing deterioration due to DC component according to polarity inversion of drive voltages and also capable of preventing the occurrence of flicker caused by the polarity inversion.

According to a broad aspect of the present invention, the above object is accomplished by providing in mixture a first-type pixel causing a first ferroelectric state by application of a positive-polarity voltage and a second-type pixel causing a second ferroelectric state by application of a negative polarity voltage, in each prescribed period (frame). The two types of pixels may be disposed adjacent to each other. In a preferred embodiment, pixels on a scanning line may be designed to be first-type pixels or second-type pixels uniformly and pixels on a data line are designed to be alternately a first-type pixel or a second-type pixels. Alternatively, it is also possible to design pixels on a data line to be first or second-type pixels uniformly and pixels on a scanning line to be alternately a first-type pixel or a second-type pixel, so as to more completely prevent the flickering. In a preferred embodiment, each pixel may be provided with an active (drive) element.

According to a more specific aspect of the present invention, there is provided a liquid crystal apparatus, comprising:

a liquid crystal device including a first substrate having thereon a plurality of scanning lines, a plurality of data lines intersecting the scanning lines, an active element disposed at each intersection of the scanning lines and data lines, a plurality of pixel electrodes each connected to the scanning line and the data line via the active element and defining a pixel, a second substrate having a counter electrode thereon, and a ferroelectric liquid crystal disposed between the first and second substrates and capable of assuming an anti-ferroelectric state under application of no voltage and a first ferroelectric state and a second ferroelectric state under application of voltages corresponding to polarities of the applied voltages, and drive means for applying voltages to the pixels so that each pixel is supplied with a voltage having a polarity which is inverted for each prescribed period, and a pixel having the ferroelectric liquid crystal in the first ferroelectric state and a pixel having the ferroelectric liquid crystal in the second state are co-present in each prescribed period.

In the above-described liquid crystal apparatus, when prescribed signals are applied to the scanning lines and data lines, the respective pixels are supplied with a voltage of a positive polarity or a negative polarity via the active element to assume a ferroelectric state or supplied with no voltage to assume an anti-ferroelectric state. By various combination of the ferroelectric state and the anti-ferroelectric state, various data may be displayed. A pixel assuming the ferroelectric state is caused to assume a first ferroelectric state and a second ferroelectric state alternately by inverting the polarity of voltage applied thereto. Further, in each prescribed period (frame), pixels assuming the first ferroelectric state and pixels assuming the second ferroelectric state are caused to be present in mixture, whereby flickering caused by a certain number of pixels are uniformly switched between the first and second ferroelectric states giving different optical states in a strict sense.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

A first embodiment of the present invention will now be described with reference to FIGS. 5–9.

Figure 5:
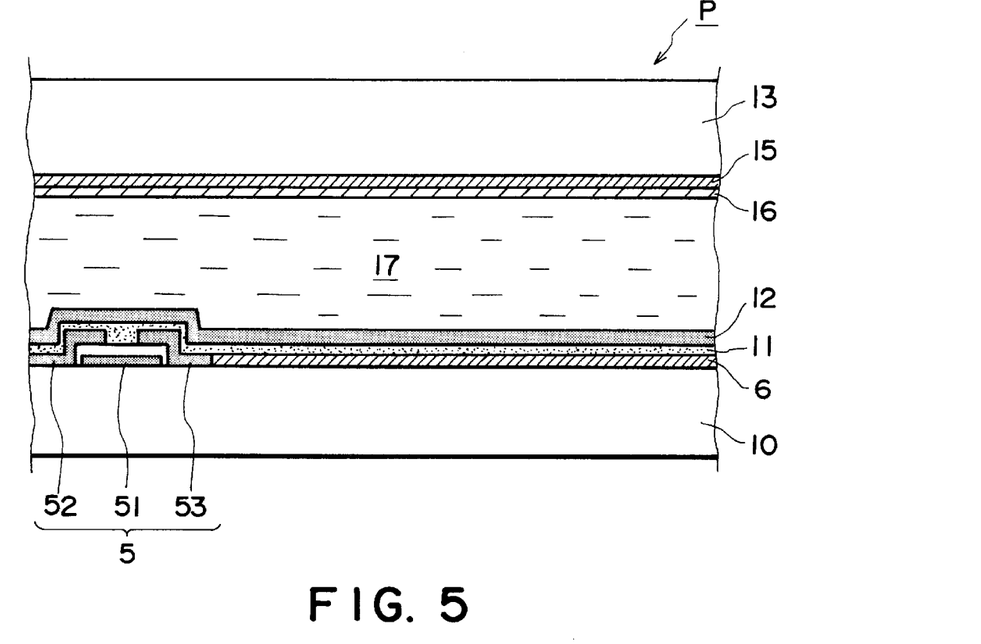
FIG. 5 is a partial sectional view showing a structure of one pixel portion of a liquid crystal display device.

A liquid crystal display device P used in this embodiment, as shown in FIG. 5, includes a trasparent glass substrate (first substrate) 10, on which scanning lines (not shown, similar to those denoted by 2 in FIGS. 3A–3B) and data lines (not shown, similar to those denoted by 3) are disposed to intersect each other. At each intersection of the scanning lines (2) and the data lines (3), a field effect transistor (active element) is disposed. Each field effect transistor 5 includes a gate 51 connected to a scanning line (2, not shown), a source 52 connected to a data line (3, not shown), and a drain 53 to which a pixel electrode 6 is connected (also as shown in FIG. 3 or FIG. 9). The transistors 5, pixel electrodes 6 and scanning and data lines are coated with an inorganic dielectric film 11 of, e.g., $SiO_2$, $Ta_2O_5$, high-resistivity ZnO, $TiO_2$ or high-resistivity SiC for preventing short circuit. The inorganic film 11 is further coated with a surface treatment film 12 of a silane coupling agent in a thickness of at most 10 nm.

Figure 6:
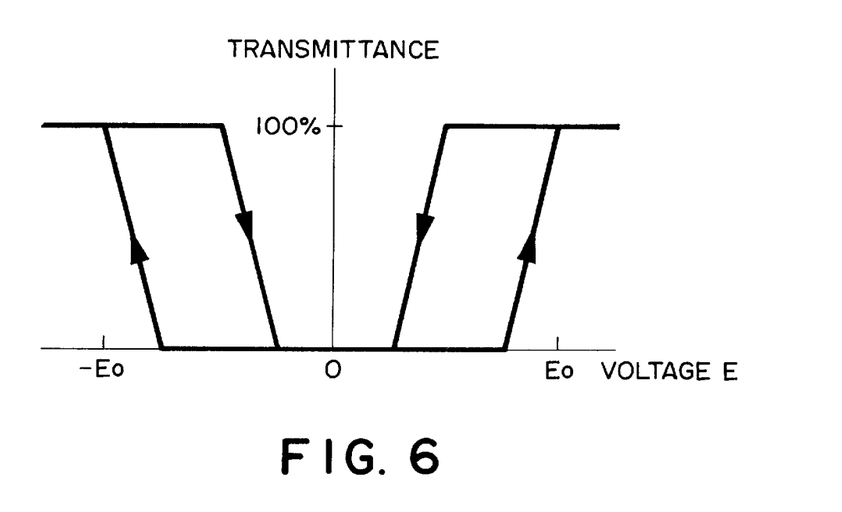
FIG. 6 is a graph showing a transmittance-applied voltage characteristic curve.

The liquid crystal display device P further includes another glass substrate (second substrate) 13, one surface of which is entirely coated with a counter electrode 15, which in turn is coated with a 5 nm-thick nylon film 16 subjected to rubbing. Incidentally, the nylon film 16 can be replaced with a polyimide film. The substrates 10 and 13 are applied to each other with spacer bead and adhesive beads dispersed therebetween so as to leave a prescribed gap (cell gap) of, e.g., 2.5 μm, which gap is thereafter filled with a ferroelectric liquid crystal 17. The ferroelectric liquid crystal 17 shows a transmittance-applied voltage characteristic as shown in FIG. 6. More specifically, when supplied with a voltage exceeding a certain threshold voltage ($E_0$=5 volts in this example) in terms of an absolute value (i.e., regardless of its polarity), the liquid crystal shows a maximum transmittance (indicated as a relative value of 100%). When supplied with a voltage in the vicinity of 0 volt, the liquid crystal shows a minimum transmittance (indicated as a relative value of 0%). Examples of the ferroelectric liquid crystal 17 may include those represented by the following formulae (1)–(10) together with their phase transition temperatures.

(1)

Cry 72.5 SmC$_A$* 117 SmC* 121.5 SmA 149.6 Iso (° C.)

(2)

Cry 74 SmC$_A$* 114 SmC* 115 SmA 123 Iso (° C.)

(3)

Cry 24.5 SmC$_A$* 74 SmC* 75.4 SmA 79.2 Iso (° C.)

(4)

Cry -2 SmC$_A$* 110 SmA 112 Iso (° C.)

(5)

Cry 18 SmC$_A$* 70.4 SmC* 71.5 SmA 79.9 Iso (° C.)

(6)

Cry 48 SmC$_A$* 73 SmC$_\gamma$* 86 SmC* 106 SmA 134 Iso (° C.)

-continued

Cry -20 SmC$_A$* 38 SmC* 40 SmA 61.9 Iso (° C.)

(7)

Cry 39.2 SmC$_A$* 87.0 SmA 103.2 Iso (° C.)

(8)

Cry 11 SmC$_A$* 31 SmX 53 SmA 72 Iso (° C.)

(9)

Cry 32 SmC$_A$* 97.0 SmA 104.0 Iso (° C.)

(10)

In the above-indicated phase transition data expressions, Cry denotes a crystal phase; SmA, smectic A phase; SmX, a smectic phase (un-identified); and Iso, isotropic phase. Further, SmC$_A$*, CmCr* and SmC* all represent chiral smectic phases, including SmC$_A$* representing a phase capable of providing a ferroelectric state and an anti-ferroelectric state, SmC* representing a phase providing only a ferroelectric state, and SmCr* representing a chiral smectic phase (further un-identified), respectively when placed in a non-helical state by suppressing the occurrence of a helical alignment state inherent to the chiral smectic phase.

Incidentally, there has been disclosed a method of multiplex-driving such a ferroelectric liquid crystal showing a hysteresis in transmittance-applied voltage characteristic as shown in FIG. 6 in a simple matrix manner by utilizing the hysteresis (JP-A 2-173624). A halftone display may be effected by using the ferroelectric liquid crystal in such a manner that the liquid crystal is once supplied with a voltage of zero for resetting and then supplied with an intermediate voltage for the halftone display.

Figure 7:
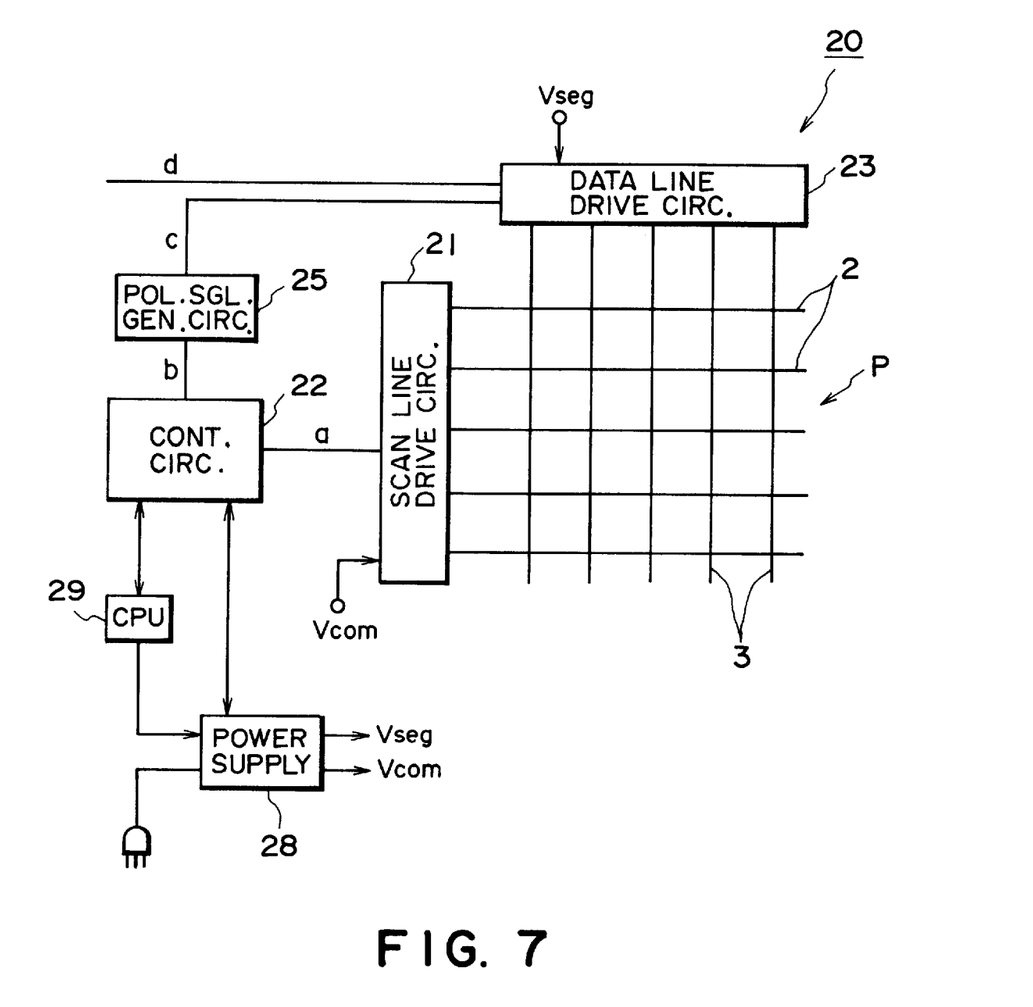
FIG. 7 is a block diagram showing an entire structure of a liquid crystal apparatus.

Now, an entire organization of liquid crystal apparatus 20 including the above-described liquid crystal display device P will be described with reference to FIG. 7.

Figure 8:
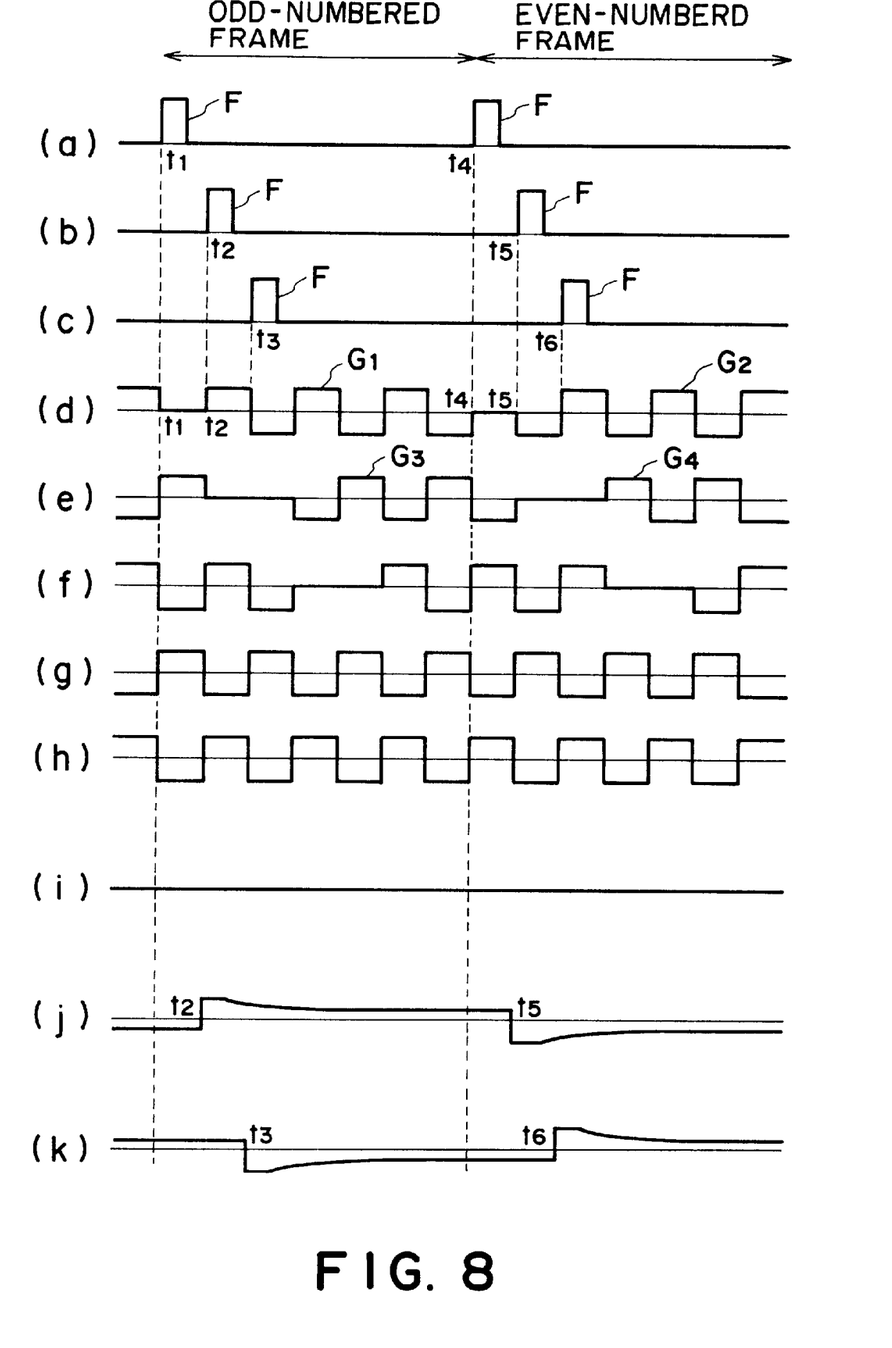
FIG. 8 is a waveform diagram showing scanning signals applied to scanning lines at (a)–(c), data signals applied to data lines at (d)–(h), and voltage waveform applied to pixels at (i)–(k).

To supplement, the above-mentioned liquid crystal display device P is sandwiched between a pair of polarizers (not shown) arranged in cross nicols. The scanning lines 2 of the liquid crystal display device P are connected to a scanning line drive circuit 21, which in turn is connected to a control circuit 22. From the control circuit 22, clock pulses a are supplied to the scanning line drive circuit 21, from which a selection voltage (scanning signal) is sequentially applied to the scanning lines 2 depending on the clock pulses a. (Details thereof will be described with reference to FIGS. 8(a)–8(c).) On the other hand, the data lines 3 are connected to a data line drive circuit 23, which is connected via a polarity signal generation circuit 25 to the control circuit 22. From the control circuit 22, a polarity control signal b is supplied to the polarity signal generation circuit 25, from which a polarity signal c is supplied based on the signal b to the data line drive circuit 23. The polarity signal c takes a level of either 0 or 1, and the data line drive circuit 23 is designed to supply a voltage (data signal) of 0 volt or +5 volts to the data lines 3 when the polarity signal c is 0. The data signal of 0 volt provides a dark state (anti-ferroelectric state), and the data signal of +5 volts provides a bright state (ferroelectric state) (as shown in FIG. 6). Whether the 0 volt or +5 volt is applied is determined depending on a combination with an image signal d. When the polarity signal c is 1, the data line drive circuit 23 supplies a data signal of 0 volt (providing a dark state) or ±5 volts (bright state) to the data lines 3. Also in this case, which data signal is applied is determined in combination with the image signal d. Further, the data signals are supplied to the data lines 3 in synchronism with the scanning signal. Further, the image signals d are inputted as 2-bit signals to the data line drive circuit 23 in parallel with the polarity signal c.

Further, a power supply circuit 28 is provided so as to supply drive voltages for the respective circuits (21, 22, 23 and 25) and the liquid crystal display device P and also a lighting voltage to a backlight (not shown). More specifically, from the power supply circuit 28, the data line drive circuit 23 is supplied with a drive voltage Vcc for the circuit 23 per se and drive voltages of 0 volt, +5 volts and −5 volts to be applied to the data lines 3, these voltages being inclusively represented by Vseg in FIG. 7.

On the other hand, the scanning line drive circuit 22 is supplied with a drive voltage Vcc for the circuit per se and a gate-on voltage Vg$_{ON}$. Vcc and Vg$_{ON}$ are inclusively represented by Vcom in FIG. 8. CPU 29 composed of a one-chip IC controls the above-mentioned circuits. The transistor provided to each pixel may preferably comprise a thin film transistor using amorphous silicon, or more preferably crystalline silicon, such as poly-silicon.

It is further preferred that the circuit 21 and circuit 23 are also integrally formed on a substrate for the liquid crystal display device P. In this instance, a thin film transistor comprising polysilicon or single-crystal silicon crystallized by annealing may preferably be used rather than amorphous silicon.

Next, the signal waveform applied to the scanning lines 2 and the data lines 3 will be described with reference to FIG.

8. At (a)–(c) of FIG. 8 are shown scanning signals F applied to the scanning lines with their waveforms and application time. More specifically, the scanning signals shown at (a)–(c) are applied to first, second and third scanning lines, respectively. Further, at FIG. 8(d)–(h) are shown data signals $G_1$ . . . applied to the data lines 3 with their waveforms and application time. More specifically, the data signals shown at (d)–(h) are applied to first–fifth data lines, respectively. Further, at FIG. 8(i) is shown a voltage waveform applied to a pixel at the intersection of the first scanning line 2 and the first data line 3; at FIG. 8(j) is shown a voltage waveform applied to a pixel at the intersection of the second scanning line 2 and the first data line 3; and at FIG. 8(k) is shown a voltage waveform applied to a pixel at the intersection of the third scanning line 2 and the first data line 3.

In this embodiment, scanning signals F are sequentially applied to the respective scanning lines 2 at time $t_1, t_2, t_3$ . . . in an odd-numbered frame and at time $t_4, t_5, t_6$, . . . in an even-numbered frame. The signal application in an odd-numbered frame and the signal application in an even-numbered frame are alternately repeated.

On the other hand, the first data line is supplied with data signals G1 of +5 volts, –5 volts, . . . from time $t_2$ in an odd-numbered frame and data signals G2 of –5 volts, +5 volts, . . . from time $t_5$ in an even-numbered frame. The data signals G1 are generated by a succession of polarity signals c of 010101 . . . and the other data signals G2 are generated by a succession of polarity signals c of 101010 . . .

The operation of the above-embodiment will now be described.

When the liquid crystal apparatus 20 is driven, clock pulses a are supplied from the control circuit 22 to the scanning line drive circuit 21, from which scanning signals F are sequentially applied to the scanning lines 2 . . . based on the clock pulses as shown at FIG. 8(a)–(c).

On the other hand, the control circuit 22 supplies polarity control signals b to the polarity signal generation circuit 25, from which polarity signals c are applied to the data line drive circuit 23. In this particular example, polarity signals c of 010101 . . . for the first data line 3, polarity signal c of 1010 . . . for the second data line, . . . are generated in an odd-numbered frame. On the other hand, polarity signals c of 10101 . . . for the first data line 3, polarity signals c of 010101 . . . for the second data line 3, . . . are generated in an even-numbered frame.

When image signals b are inputted to the data line drive circuit 23, the data line drive circuit 23 supplies a voltage (data signal) of any one of 0 volt, +5 volts and –5 volts to each data line 3 (FIG. 8(d)–(h)).

Accordingly, the first scanning line 2 (i.e., the gate 51 of a field effect transistor 5) is supplied with a scanning signal F at time $t_1$, and time $t_4$ (FIG. 8(a)). At this time, the first data line 3 (i.e., the source 52 of the field effect transistor 5) is not supplied with a data signal G1 or G2 (FIG. 8(d)), the pixel electrode 6 connected to the drain 53 is placed at a potential of 0 volt (FIG. 8(i)), whereby the pixel concerned continues to display a dark state.

On the other hand, the second scanning line 2 (i.e., the gate 51) is supplied with a scanning signal F at time $t_2$ (FIG. 8(b)), when the first data line 3 (i.e., the source 52) is supplied with a data signal G1 of +5 volts (FIG. 8(d)), so that a voltage of +5 volts is applied to and held at the pixel electrode 6 connected to the drain 53. As a result, a pixel at the intersection of the second scanning line 2 and the first data line 3 is brought to a first bright state (first ferroelectric state). Further, the second scanning line 2 (i.e., gate 51) is also supplied with a scanning signal F at time $t_5$ in an even-numbered frame (FIG. 8(b)), when the first data line 3 (i.e., source 52) is supplied with a data signal G2 of –5 volts, so that a voltage of –5 volts is supplied to and held at the pixel at the intersection of the second scanning line and the first data line, whereby the pixel assumes a second bright state (second ferroelectric state). In other words, also in this embodiment, an individual pixel is subjected to a polarity-inversion drive method similarly as the conventional method, so that the pixel assumes a first bright state in an odd-numbered frame and a second bright state in an even-numbered frame to continually display a bright state by repetition of the drive operation.

In this embodiment, other pixels similarly displaying a bright state are also driven by the polarity inversion drive method. However, the applied voltage polarities are different between mutually adjacent pixels. Hereinbelow, some explanation is given with respect to a pixel at the intersection of a third scanning line 2 and a first data line 3, for example.

That is, the third scanning line 3 (i.e., gate 51) is supplied with a scanning signal F at time $t_3$ in an odd-numbered frame (FIG. 8(c)), when the first data line 3 (i.e., source 52) is supplied with a data signal G1 of –5 volts (FIG. 8(d)), so that the voltage of –5 volts is supplied to and held at a pixel electrode connected to the drain 53, whereby the pixel assumes a second bright state. Further, the same scanning line 2 (gate 51) is supplied with a scanning signal F at time $t_6$ in an even-numbered frame (FIG. 8(c)), when the first data line 3 (source 52) is supplied with a data signal G2 of +5 volts, whereby the same pixel at the intersection of the third scanning line and the first data line is supplied with the voltage of +5 volts to hold the voltage, whereby the pixel assumes the first bright state. Thus, the pixel assumes the second bright state in an odd-numbered frame and the first bright state in an even-numbered frame to continually display a bright state by repetition of the drive operation.

As a result of the voltage application in the above-described manner in this embodiment, pixels displaying a first bright state by application of a positive-polarity voltage and pixels displaying a second bright state by application of a negative-polarity voltage are co-present and in mixture with each other in either of an odd-numbered frame and an even-numbered frame. Consequently, as a result of the application of drive voltages shown at FIGS. 8(a)–(h), the liquid crystal display device P provides a display state as shown in FIG. 9A in an odd-numbered frame and a display state as shown in FIG. 9B in an even-numbered frame.

Figure 9A:
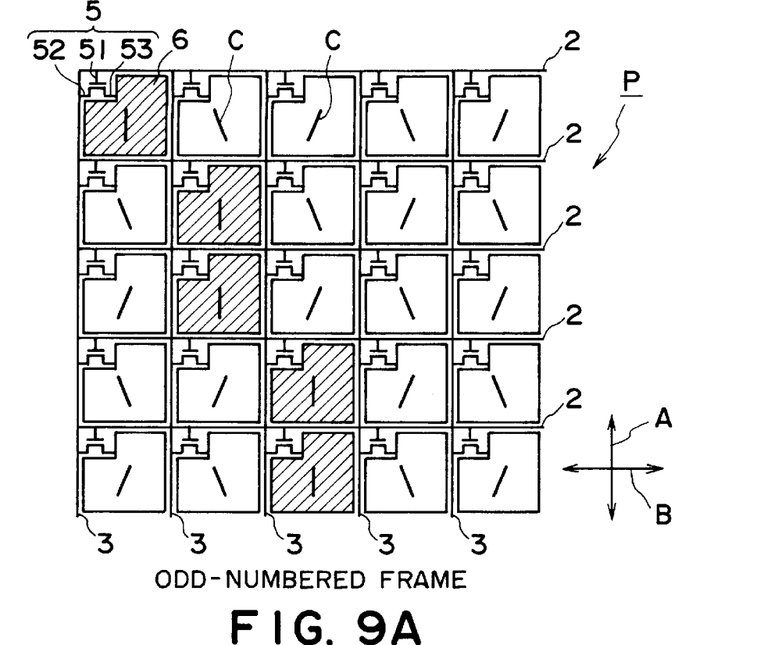
FIGS. 9A and 9B are illustrations of display states at respective pixels in an embodiment of the liquid crystal apparatus according to the invention, including FIG. 9A showing a display state in an odd-numbered frame and FIG. 9B showing a display state in an even-numbered frame.
Figure 9B:
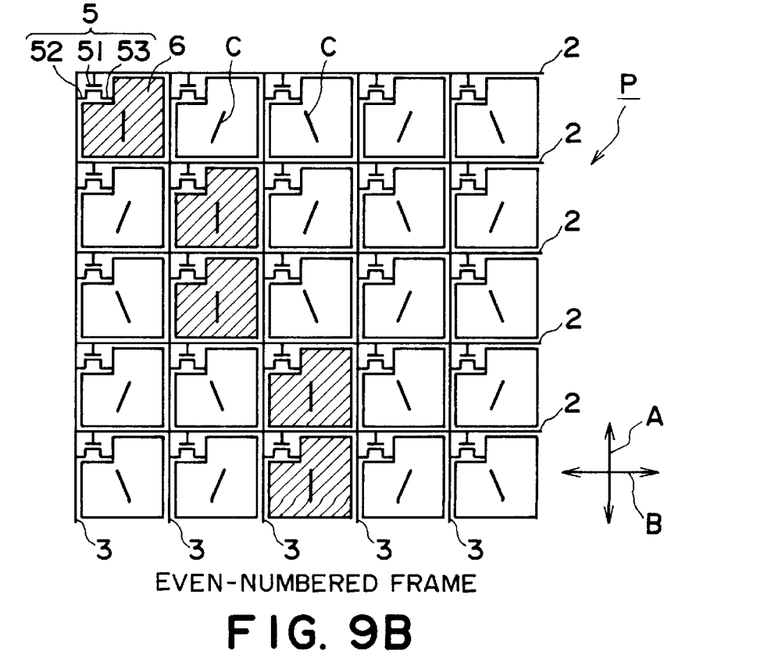

Referring to FIGS. 9A and 9B, a pixel having a short line C (representing an average optical axis of liquid crystal molecules) of right end up means a pixel in the first bright state and a pixel having a short line C of right end down is a pixel in the second bright state, while a hatched pixel having a vertical short line C means a pixel in a dark state. The liquid crystal display device displays various data as a combination of pixels in such bright states and dark state.

In this embodiment, as shown in FIGS. 9A and 9B, pixels (indicated with a line C of right end up) display the first bright state by application of a positive voltage and pixels (indicated with a line C of right end down) displaying the second bright state by application of a negative voltage are co-present and in mixture in either of an odd-numbered frame (FIG. 9A) and an even-numbered from (FIG. 9B). More specifically, the pixels displaying the first bright state and the pixels displaying the second bright state alternate vertically and laterally, i.e., in a so-called checker pattern arrangement. The checker pattern arrangement is satisfied in both an odd-numbered frame and an even-numbered frame while each pixel is supplied with mutually inverted polarities of drive signals in these frames.

According to the above embodiment, the following effects may be attained.

Each pixel displaying a bright state is subjected to polarity inversion drive and is supplied with voltages of mutually inverted polarities in an odd-numbered frame and in an even-numbered frame as shown at FIG. 8(j), whereby the voltage applied to the liquid crystal averagely becomes 0, thus avoiding a degradation of liquid crystal due to DC component.

Further, as is understood from FIG. 8(j) and FIG. 8(k) in combination, mutually neighboring pixels both displaying bright states are supplied with different polarities of voltages, so that a pixel displaying the first bright state by application of a positive-polarity voltage and a pixel displaying the second bright state by application of a negative-polarity voltage are disposed adjacent to each other. Accordingly, even if the liquid crystal display device P is viewed in an oblique direction, such as an oblique right or left direction or an oblique upper or lower direction, the difference in transmittance or tinging is alleviated, thereby better preventing the occurrence of flicker and providing an improved display quality. Further, the difference in transmittance or hue when viewed in oblique opposite directions, e.g., in an oblique right direction and an oblique left direction, can be alleviated to provide a generally improved viewing angle characteristic.

Further, in this embodiment, one glass substrate 13 is provided with a rubbed nylon film 16, and the other glass substrate 10 is provided with a surface treatment film 12 of a silane coupling agent. The surface treatment film 12 shows a lower surface energy and exerts a weaker homogeneous alignment power to the liquid crystal 17 compared with the rubbed nylon film 16. As a result, when the liquid crystal is cooled from isotropic phase into smectic phase, the directional ordering and smectic layer ordering are caused preferentially from the rubbed nylon film 16 side. In contrast thereto, in the case of using a rubbed film on both sides, the ordering function is given from both sides to be liable to result in alignment deffects In this embodiment, such a difficulty is not encountered but a uniform alignment can be attained.

Figure 10A:
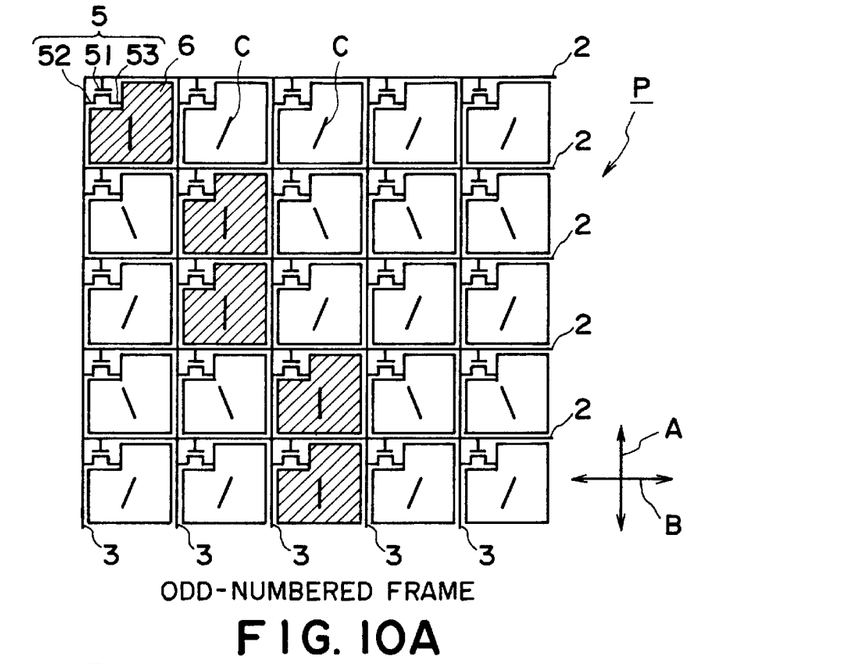
FIGS. 10A and 10B are illustrations of display states at respective pixels in another embodiment of the liquid crystal apparatus according to the invention, including FIG. 10A showing a display state in an odd-numbered frame and FIG. 10B showing a display state in an even-numbered frame.
Figure 10B:
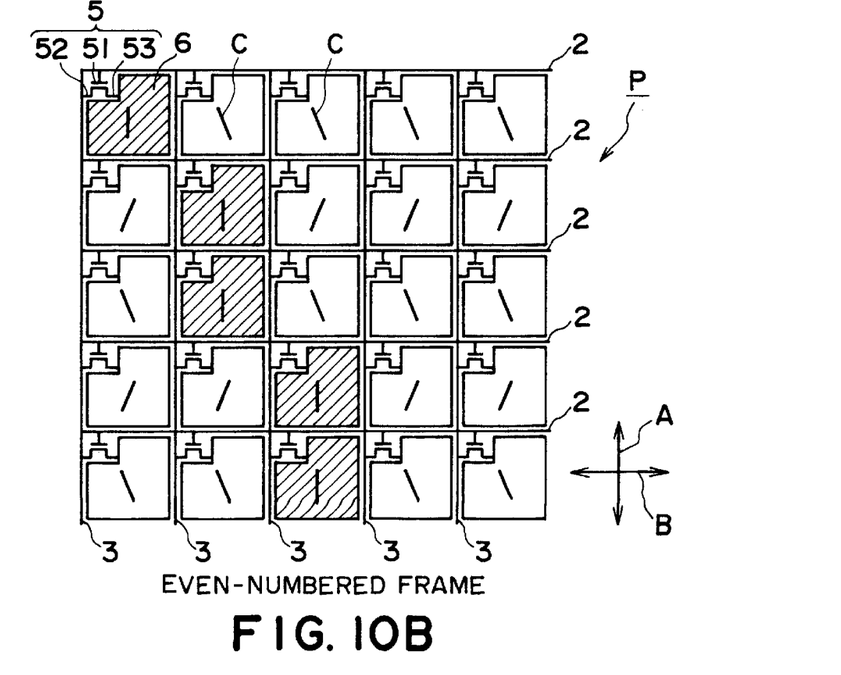

Next, other embodiments will be described with reference to FIGS. 10–12.

In the above embodiment shown in FIGS. 9A and 9B, the pixels assuming the first bright state and the pixels assuming the second bright state are disposed to alternate both vertically and laterally. However, this is not necessary. For example, as shown in FIGS. 10A and 10B, pixels disposed laterally along a scanning line 2 may be uniformly supplied with a voltage of the same polarity for displaying a bright state, i.e., so as to have optical axes (represented by lines C) having an identical direction, and pixels disposed vertically along a data line 3 may be alternately supplied with voltages of different polarities so as to have alternately tilted optical axes.

Figure 11A:
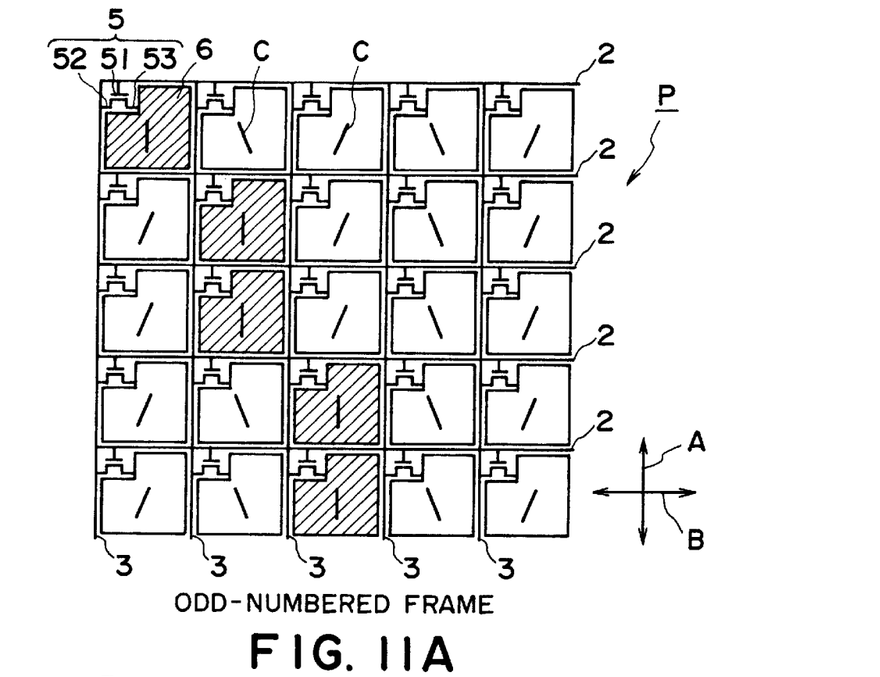
FIGS. 11A and 11B are illustrations of display states at respective pixels in still another embodiment of the liquid crystal apparatus according to the invention, including FIG. 11A showing a display state in an odd-numbered frame and FIG. 11B showing a display state in an even-numbered frame.
Figure 11B:
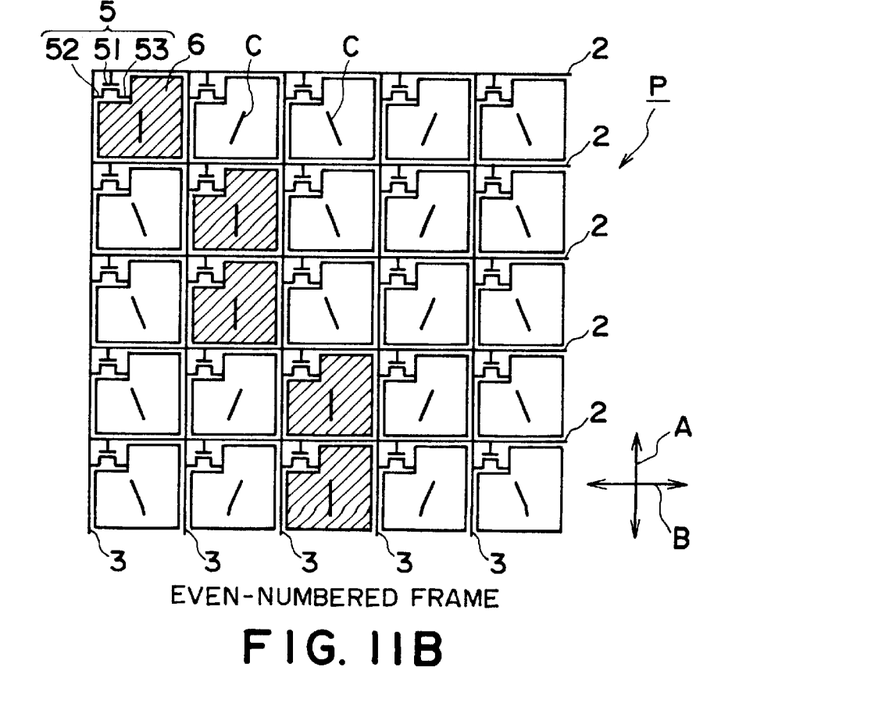
Figure 12A:
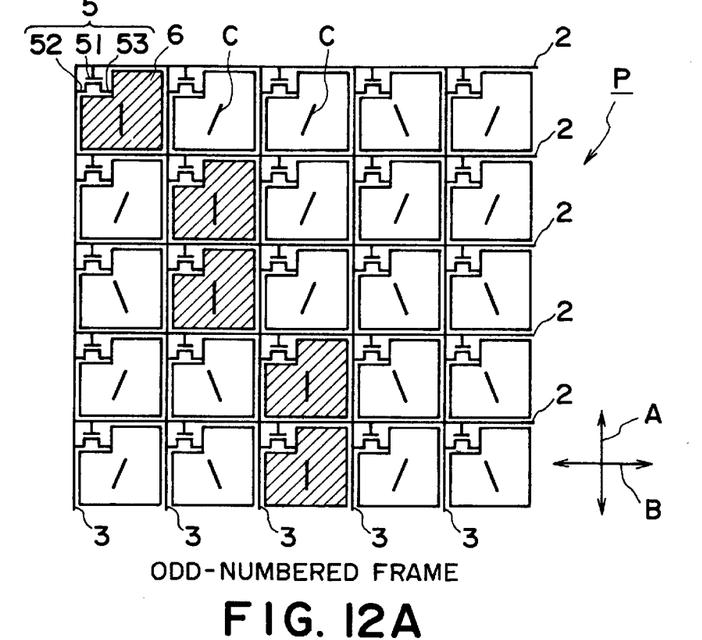
FIGS. 12A and 12B are illustrations of display states at respective pixels in still another embodiment of the liquid crystal apparatus according to the invention, including FIG. 12A showing a display state in an odd-numbered frame and FIG. 12B showing a display state in an even-numbered frame.
Figure 12B:
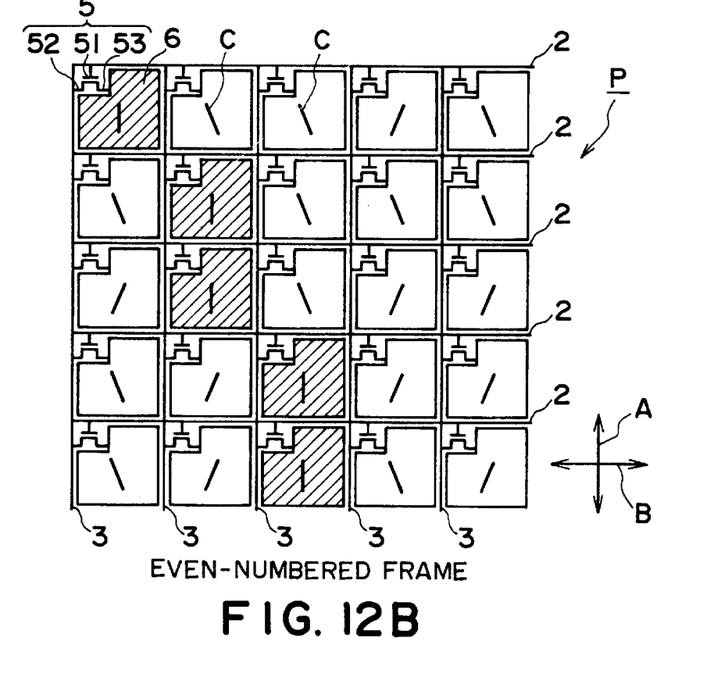

Alternatively, as shown in FIGS. 11A and 11B, pixels disposed laterally along a scanning line 2 may be supplied with alternately different polarities of voltages for displaying a bright state, and pixels disposed vertically along a data line 3 may be supplied with an identical polarity of voltages for displaying a bright state.

Further, it is also possible to dispose pixels assuming the first bright state and pixels assuming the second bright state are arranged in an irregular manner at a glance.

In this way, by selecting the arrangement of pixels assuming the first bright state and pixels assuming the second bright state appropriately depending on an image pattern to be displayed, it becomes possible to effectively prevent the flickering on a picture.

As described above, according to the present invention, the deterioration of a ferroelectric liquid crystal due to DC component can be prevented by alternating the polarity of voltage applied to a pixel (i.e., a voltage applied between a pixel electrode and a counter electrode) for displaying a bright state for each prescribed period (frame) to have (the liquid crystal at) the pixel alternately assume a first ferroelectric state and a second ferroelectric state, thereby continuously displaying a bright state.

Further, in the present invention, a pixel assuming a first ferroelectric state by application of one polarity voltage and a pixel assuming a second ferroelectric state by application of the other polarity voltage are present in mixture in each prescribed period, the flickering on the liquid crystal display device when viewed in an oblique direction can be obviated to provide an improved display quality. Further, by disposing a pixel assuming the first ferroelectric state by application of one polarity and a pixel assuming the second ferroelectric state by application of the other polarity voltage adjacent to each other; or by disposing the pixels so that pixels along a scanning line receive an identical polarity of voltage for assuming a ferroelectric state and pixels along a data line receive alternately different polarities of voltage for assuming ferroelectric states; or by disposing the pixels so that pixels along a scanning line receive alternately different polarities of voltage for assuming ferroelectric states and pixels along a data line receive an identical polarity of voltage for assuming a ferroelectric state; it becomes possible to further completely alleviate the above-mentioned irregularity, such as flickering.

What is claimed is:

1. A liquid crystal apparatus, comprising:

a liquid crystal device including a first substrate having thereon a plurality of scanning lines, a plurality of data lines intersecting the scanning lines, an active element disposed where the scanning lines and data lines intersect, a plurality of pixel electrodes each connected to the scanning line and the data line via the active element and defining a pixel, a second substrate having a counter electrode thereon, and a ferroelectric liquid crystal disposed between the first and second substrate and capable of assuming an anti-ferroelectric state under application of no voltage and a first ferroelectric state and a second ferroelectric state under application of voltages corresponding to polarities of the applied voltages, and a driver for applying voltages to the pixels whereby each pixel is supplied with a voltage having a polarity which is inverted for a prescribed period, and a pixel having the ferroelectric liquid crystal in the first ferroelectric state and a pixel having the ferroelectric liquid crystal in the second state are co-present in each prescribed period such that vertically and horizontally adjacent pixels may not have their respective ferroelectric liquid crystals in the same first or second state, wherein
said anti-ferroelectric state exhibits a dark state, and
said first and second ferroelectric states exhibiting bright states showing different transmittances when the liquid crystal device is viewed in an oblique direction.

2. A liquid crystal apparatus according to claim 1, wherein the pixel having the ferroelectric liquid crystal in the first ferroelectric state and the pixel having the ferroelectric liquid crystal in the second ferroelectric state are disposed adjacent to each other in each prescribed period.

3. A liquid crystal apparatus according to claim 1, wherein pixels along a scanning line receive an identical polarity of voltage for having the ferroelectric liquid crystal assume a ferroelectric state and pixels along a data line receive alternately different polarities of voltages for having the ferroelectric liquid crystal assume a ferroelectric state.

4. A liquid crystal apparatus according to claim 1, wherein pixels along a data line receive an identical polarity of voltage for having the ferroelectric liquid crystal assume a ferroelectric state and pixels along a scanning line receive alternately different polarities of voltages for having the ferroelectric liquid crystal assume a ferroelectric state.

* * * * *

UNITED STATES PATENT AND TRADEMARK OFFICE
CERTIFICATE OF CORRECTION

PATENT NO.      : 6,195,137 B1
DATED           : February 27, 2001
INVENTOR(S)     : Yutaka Inaba et al.

Page 1 of 1

It is certified that error appears in the above-identified patent and that said Letters Patent is hereby corrected as shown below:

Title page,
Item [22], FILED, "Nov. 3, 1995" should read -- Nov. 13, 1995 --.
Item [56], References Cited,
"06020278" should read -- 06-020278; and
"06202078" should read -- 06-202078.

Column 2,
Line 44, "ai" should read -- a --.

Column 5,
Line 13, "trasparent" should read -- transparent --.

Column 8,
Line 35, "±5" should read -- 5 --.

Column 10,
Line 64, "from" should read -- frame --.

Signed and Sealed this

Eighteenth Day of June, 2002

*Attest:*

JAMES E. ROGAN
*Attesting Officer*    Director of the United States Patent and Trademark Office

UNITED STATES PATENT AND TRADEMARK OFFICE
CERTIFICATE OF CORRECTION

PATENT NO. : 6,195,137 B1
DATED : February 27, 2001
INVENTOR(S) : Yutaka Inaba et al.

It is certified that error appears in the above-identified patent and that said Letters Patent is hereby corrected as shown below:

Title page,
Item [22], FILED "Nov. 3, 1995" should read -- Nov. 13, 1995 --.
Item [56], References Cited,
"06020278" should read -- 06-020278 --; and
"06202078" should read -- 06-202078 --.

Column 2,
Line 44, "ai" should read -- a --.

Column 5,
Line 13, "trasparent" should read -- transparent --.

Column 8,
Line 35, "±5" should read -- -5 --.

Column 10,
Line 64, "from" should read -- frame --.

This certificate supersedes Certificate of Correction issued June 18, 2002.

Signed and Sealed this

Thirteenth Day of July, 2004

JON W. DUDAS
*Acting Director of the United States Patent and Trademark Office*